United States Patent [19]
Durrani et al.

[11] Patent Number: 6,057,840
[45] Date of Patent: May 2, 2000

[54] COMPUTER-IMPLEMENTED USER INTERFACE HAVING SEMI-TRANSPARENT SCROLL BAR TOOL FOR INCREASED DISPLAY SCREEN USAGE

[75] Inventors: Sulaiman Durrani, San Diego; Clay Karmel, San Jose, both of Calif.

[73] Assignees: Sony Corporation of Japan, Tokyo, Japan; Sony Electronics, Inc., Park Ridge, N.J.

[21] Appl. No.: 09/049,780

[22] Filed: Mar. 27, 1998

[51] Int. Cl.[7] .................................................. G06F 3/00
[52] U.S. Cl. ........................................ 345/341; 345/342
[58] Field of Search ..................................... 345/341, 340, 345/333, 334, 335, 336–338, 342, 343, 344, 345, 347

[56] References Cited

U.S. PATENT DOCUMENTS

| | | | |
|---|---|---|---|
| 5,283,560 | 2/1994 | Bartlett | 345/113 |
| 5,333,247 | 7/1994 | Gest et al. | 395/138 |
| 5,339,391 | 8/1994 | Wroblewski et al. | 395/157 |
| 5,388,202 | 2/1995 | Squires et al. | 395/119 |
| 5,528,259 | 6/1996 | Bates et al. | 345/121 |
| 5,530,455 | 6/1996 | Gillick et al. | 345/163 |
| 5,532,715 | 7/1996 | Bates et al. | 345/123 |
| 5,553,225 | 9/1996 | Perry | 395/157 |
| 5,651,107 | 7/1997 | Frank et al. | 395/344 |
| 5,655,094 | 8/1997 | Cline et al. | 345/341 |
| 5,657,049 | 8/1997 | Ludolph et al. | 345/145 |
| 5,745,098 | 4/1998 | Yamaji | 345/121 |
| 5,854,629 | 12/1998 | Redpath | 345/341 |
| 5,864,330 | 1/1999 | Haynes | 345/123 |
| 5,867,158 | 2/1999 | Murasaki et al. | 345/341 |
| 5,874,961 | 2/1999 | Bates et al. | 345/341 |

*Primary Examiner*—Steven P. Sax
*Attorney, Agent, or Firm*—Wagner, Murabito & Hao LLP

[57] ABSTRACT

A computer-implemented user interface having a semi-transparent scroll bar tool for increased screen usage. The present invention includes a user interface having one or more scroll bar tools displayed within a window area of a computer screen. The scroll bars are semi-transparent in that they allow the visualization of text and/or other graphical information that coincides in screen location with the scroll bars (e.g., "behind information"). By allowing the visualization of "behind information," the present invention effectively increases the display screen's usable space for displaying information to a user. This capability is particularly advantageous when used in combination with products that have small display screens and/or when used in combination with products that allow the user to interact with the display screen (e.g., for inputting or accessing information using a touch screen or stylus etc.). For instance, the present invention is particularly advantageous for use on the relatively small screens of personal digital assistants (PDAs), portable telephones, portable computing devices, etc. Within the present invention, each scroll bar tool includes a semi-transparent graphical image with which a user can interact thereby effecting the horizontal or vertical scrolling of text and/or other graphical information associated with an open work file or "document." In one embodiment, the size of the graphical image depends on the relative portion of information displayed on the display screen to the total information within the open document in a given direction (e.g., horizontal or vertical).

18 Claims, 22 Drawing Sheets

Report 1

John Wilson
Terry Guard
Hillary Sun
Bill Billiard
Steve Young
and
Sandy Wilson

Report 1

Status

| | |
|---|---|
| John Wilson | 74 Oak St., New Berry |
| Terry Guard | 100 Oaks Pl., Apt. 34, New Berry |
| Hillary Sun | 543A Main Street, New Berry |
| Bill Billiard | 34 Palm St., New Berry |
| Steve Young | 89 Polk St., New Berry |
| Sandy Wilson | 34 W. First St., New Berry |

Report 1

Status

| | |
|---|---|
| John Wilson | 74 Oak St., New Berry |
| Terry Guard | 100 Oaks Pl., Apt. 34, New Berry |
| Hillary Sun | 543A Main Street, New Berry |
| Bill Billiard | 34 Palm St., New Berry |

COMPUTER-IMPLEMENTED USER INTERFACE HAVING SEMI-TRANSPARENT SCROLL BAR TOOL FOR INCREASED DISPLAY SCREEN USAGE

BACKGROUND OF THE INVENTION

1. Field of the Invention

The present invention relates to the field of graphical user interfaces in an information management system. More specifically, the present invention relates to the field of graphical user interfaces used to display information on a display screen of a computer system or other electronic device used for information management.

2. Related Art

Computer systems are used today in wide applications that involve accessing and displaying information generally in response to some user interaction (e.g., via a keyboard and/or a cursor directing device). Information management systems, such as those which are used or can be adapted for use in computer systems, are placing increasing demands on the physical resources available for displaying information on a display screen. In many applications, it is always desired to display more information on a display screen so that a user can maximize the amount of information presented to him or her. Therefore, there exists a need for better and more efficient mechanisms and methods for presenting information to a user via a computer display screen.

Information management systems utilize specially developed screen displays that incorporate individual display images, as well as display information, that are presented in formats that allow the user to effectively gain access to the information of the information management system. Therefore, a particular screen display can be viewed as having both display "tools" (also called graphical user interface tools) and display "information." Typically, the display tools reside within a tool region and the display information resides within an information region. The display tools are used to give the user special abilities to organize, manage and access information while the display "information" constitutes either the resultant data desired or the application program the user desires to interact with or otherwise operate.

The current art in the field of graphical user interfaces for the display of information within an information management system utilizes delimited rectangular sections of screen display area to manage information. These delimited rectangular sections of screen display area are often called "windows." An application program, e.g., a word processor program, can generate a "window" in which information pertaining to a file (also called a document) can be displayed to a user in an "information region". It is often the case that the information within the file is larger than can be displayed within the window area reserved for the application program. In accordance with the prior art, "scroll bay" tools are provided within the window to solve this problem. The user interacts with the scroll bar tools, e.g., with a user-directed cursor, causing the information pertaining to the file to scroll across the display screen, into and out of the "information region," so that a user can make visible, and thereby access, different portions of the file.

However, some display screens are quite small. Especially those display screens that are associated with portable computer systems, portable electronic devices that act as information management systems and portable and/or handheld consumer-based electronic devices. For instance, personal digital assistants (PDAs) can be quite small, e.g., palm sized, and have correspondingly small display screens. Many consumer-based electronic devices, e.g., camcorders and telephones, also have reduced-sized display screens that are used for interacting with the device. In these cases, the display screen doubles as an information input device by using touch screen technology. In these cases, it is important to maximize the usable area of the display screen for viewing information because: (1) the screen is small to start with; and (2) the display screen doubles as an information input device (e.g., in the case of a touch screen).

Several prior art computer displays are discussed. U.S. Pat. No. 5,388,202 describes a method for generating window boarders having pictorial frame elements. However, U.S. Pat. No. 5,388,202 describes generating a window frame, or boarder, that is always displayed around and separate from the information content. The window frame, or boarder, is not transparent and therefore does not allow the display of information therethrough. The U.S. Pat. No. 5,388,202 patent does not describe a mechanism for increasing the viewable area of a display screen because it requires the use of display screen area for a graphical image of the window frame that is separate from the displayed user information.

U.S. Pat. No. 5,283,560 describes the use of a menu, not of a scroll bar nor of scrolling using a scroll bar. A scroll bar and the scrolling function within a graphical user interface are entirely different from a pull down or a pop-up menu item. Menu items provide a selection for predetermined program functions while the scrolling function allows different portions of user data to be displayed on the display screen. The menu item of U.S. Pat. No. 5,283,560 does not deal with the display of user data of a document. Therefore, U.S. Pat. No. 5,283,560 does not provide a mechanism for increasing the available area of a display screen for viewing user data or user information within a document.

U.S. Pat. No. 5,339,391 describes a scroll bar that is not transparent and does not allow the display of information therethrough. The scroll bar taught by U.S. Pat. No. 5,339,391 therefore consumes display screen area thereby taking away display space from user information. As such, U.S. Pat. No. 5,339,391 does not describe a mechanism for increasing the viewable area of a display screen for user information. Another patent, U.S. Pat. No. 5,333,247 describes a scrolling device that is not transparent and sits on top of the displayed content. Because this scrolling device is not transparent, it prevents parts of the previously displayed content from being seen. Therefore, U.S. Pat. No. 5,333,247 likewise does not provide a mechanism for increasing the available area of a display screen for the viewing of user data or user information.

U.S. Pat. No. 5,528,259 describes a scrolling device that is not transparent but is two dimensional. However, this scrolling device, like many other graphical scrolling devices, takes up extra screen area for its own display. Therefore, U.S. Pat. No. 5,528,259 does not provide a mechanism for increasing the available area of a display screen for the viewing of user data or user information. Another patent, U.S. Pat. No. 5,532,715, describes a scrolling device that is not transparent and that needs its own separate area on the display screen. Therefore, U.S. Pat. No. 5,532,715, likewise, does not provide a mechanism for increasing the available area of a display screen for the viewing of user data or user information.

U.S. Pat. No. 5,553,225 describes a graphical scrolling device that is also located on a frame outside of the content display area. This scrolling device takes up screen space because it is not transparent and is described as being located within a graphical frame, thereby consuming additional display area. Therefore, U.S. Pat. No. 5,553,225 does not provide a mechanism for increasing the available area of a display screen for the viewing of user data or user information.

U.S. Pat. No. 5,651,107 describes the use of a transparency or alpha blending by allowing data of other windows to be viewed through windows that lie on top of the window that contains data. However, U.S. Pat. No. 5,651,107 does not describe scrolling or the use of scroll bars for increasing the viewable area of user information on a display screen. Moreover, U.S. Pat. No. 5,651,107 does not make any mention of increasing the usable display area by using a scrolling device or where such a scrolling device would be located with respect to the windows and their data.

SUMMARY OF THE INVENTION

Accordingly, the present invention provides a graphical user interface in which the scroll bar tools are used to increase the viewable area of a display screen for user information. More specifically, the present invention utilizes semi-transparent scroll bars that allow the visualization of user information therethrough. The present invention does not make use of an "information region" and a separate "tool region," as used in the prior art. Instead, the present invention merges the "information region" of an application's window area with its "tool region" and makes the scroll bar tool semi-transparent. This effectively increases the usable display area of the display screen. The present invention is therefore particularly advantageous for small screen applications.

A computer-implemented user interface is disclosed having a semi-transparent scroll bar tool for increased screen usage. The present invention includes a user interface having one or more scroll bar tools displayed within a display window area of a computer screen. The scroll bars are semi-transparent in that they allow the visualization of text and/or other graphical information that coincides in screen location with the scroll bars (e.g., "behind information"). By allowing the visualization of "behind information," the present invention effectively increases the display screen's usable space for displaying information to a user. This capability is particularly advantageous when used in combination with products that have small display screens and/or when used in combination with products that allow the user to interact with the display screen (e.g., for inputting or accessing information using a touch screen or stylus etc.). For instance, the present invention is particularly advantageous for use on the relatively small screens of personal digital assistants (PDAs), portable telephones, portable computing devices, etc. Within the present invention, each scroll bar tool includes a semi-transparent graphical image of a button with which a user can interact thereby effecting the horizontal or vertical scrolling of text and/or other graphical information associated with an open work file or "document." In one embodiment, the size of the button image depends on the relative portion of information displayed on the display screen to the total information within the open document in a given direction (e.g., horizontal or vertical).

In one embodiment of the present invention, the scroll bar tool takes the shape, graphically, of an animal (e.g., a snake). The snake is semi-transparent and contains graphic images representing a head and a tail. The snake's transparency allows the content located behind the snake to remain viewable to a user. The body of the snake is located along the edges of the display screen and, according to one embodiment, wraps around a lower corner of the display screen to provide both horizontal and vertical scroll bar tools. The above-referenced button images are implemented as "bulges" within the snake body and represent food (e.g., mice) that has been eaten by the snake. The bulges can increase or decrease in size depending on the relative portion of information displayed on the display screen to the total information within the open document in a given direction (e.g., horizontal or vertical). Scrolling is effected by interfacing directly with the "bulges" or by interfacing with other portions of the snake body.

More specifically, in a computer system having a processor coupled to a bus, a memory device coupled to the bus and a display screen coupled to the bus, embodiments of the present invention include a method for displaying information on the display screen comprising the computer-implemented steps of: a) displaying a portion of an information bearing document within a window on the display screen; b) displaying a first elongated graphic image along a first edge of the window; c) using the first elongated graphic image, controlling user interactive scrolling of the information bearing document in a first direction; d) displaying a second elongated graphic image along a second edge of the window; and e) using the second elongated graphic image, controlling user interactive scrolling of the information bearing document in a second direction, wherein the first elongated graphic image and the second elongated graphic image are each semi-transparent allowing text and/or other graphic images associated with the information bearing document to be visualized therethrough.

Embodiments include the above and wherein the first elongated graphic image comprises a first movable graphic image that is semi-transparent, and wherein the step c) comprises the step of scrolling the information bearing document in the first direction in response to, and in relative proportion to, a displacement-of the first movable graphic image along the first edge of the window. Embodiments include the above and wherein the second elongated graphic image comprises a second movable graphic image that is semi-transparent, and wherein the step e) comprises the step of scrolling the information bearing document in the second direction in response to, and in relative proportion to, a displacement of the second movable graphic image along the second edge of the window. Embodiments include the above and further comprising the step of f) varying the size of the first movable graphic image depending on a relationship between the portion of information displayed within the window, along the first direction, to the total amount of information within the information bearing document along the first direction.

BRIEF DESCRIPTION OF THE DRAWINGS

FIG. 2 is an illustration of a window area in accordance with the present invention with a document displayed in-full therein.

FIG. 4A is a logical diagram of a window area in accordance with the present invention with a document exceeding a horizontal edge of the window area.

FIG. 4B is a rendition of the configuration of FIG. 4A as displayed on a computer screen and illustrating a semi-transparent scroll bar tool of the present invention.

FIG. 8 is an exemplary document used to illustrate aspects of the present invention as described with reference to FIGS. 9A, 9B, 9C, 9D, 10A, 10B, 10C and 10D.

FIG. 9A is a logical diagram illustrating the window area of the present invention, with semi-transparent scroll bars, positioned in a first scroll position over the exemplary document of FIG. 8.

FIG. 9B is a logical diagram illustrating the window area of the present invention, with semi-transparent scroll bars, positioned in a second scroll position over the exemplary document of FIG. 8.

FIG. 9C is a logical diagram illustrating the window area of the present invention, with semi-transparent scroll bars, positioned in a third scroll position over the exemplary document of FIG. 8.

FIG. 10A is a rendition of the configuration of FIG. 9A as displayed on a computer screen in accordance with the present invention and illustrating the semi-transparent scroll bars.

FIG. 10B is a rendition of the configuration of FIG. 9B as displayed on a computer screen in accordance with the present invention and illustrating the semi-transparent scroll bars.

FIG. 10C is a rendition of the configuration of FIG. 9C as displayed on a computer screen in accordance with the present invention and illustrating the semi-transparent scroll bars.

FIG. 10D is a rendition of the configuration of FIG. 9D as displayed on a computer screen in accordance with the present invention and illustrating the semi-transparent scroll bars.

DETAILED DESCRIPTION OF THE INVENTION

Figure 1:
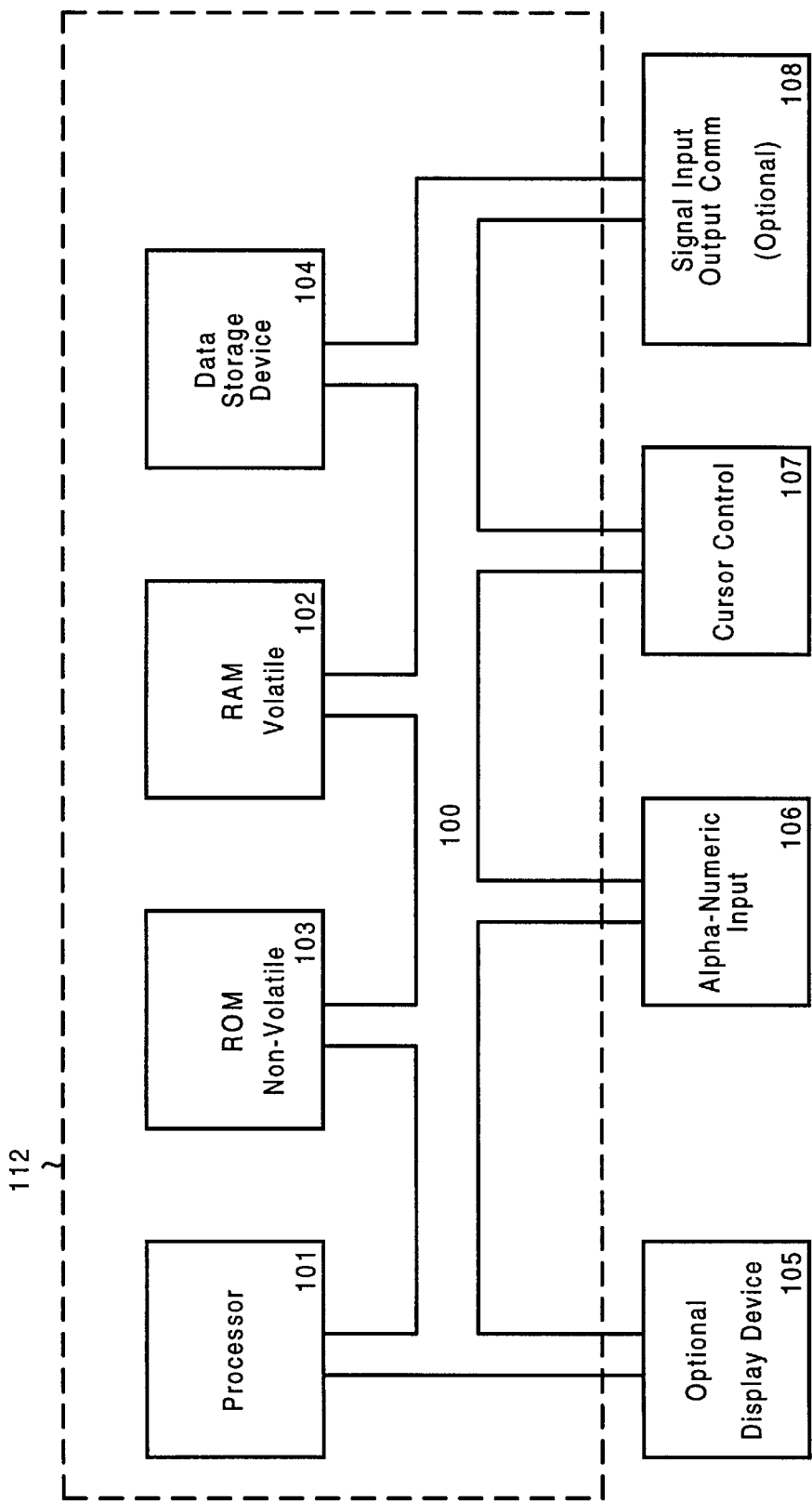
FIG. 1 illustrates a general purpose computer system utilized in accordance with an embodiment of the present invention.

In the following detailed description of the present invention, a computer-implemented user interface having semi-transparent scroll bar tools for increased screen usage, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and-memories into other data similarly represented as physical quantities within the computer system memories or registers or other such information storage, transmission or display devices.

Computer System 112

Aspects of the present invention, described below, are discussed in terms of steps executed on an information management system (e.g., process 400) which generate user interface tools that are displayed on a computer screen or "display." The information management system can include one or more computer systems. Within the present invention, the computer system can be integrated within a portable electronic device or system, e.g., a personal digital assistant, a portable computer system (e.g., a laptop, a palm sized device), or a portable consumer based electronic device. Although a variety of different computer systems can be used with the present invention, an exemplary general purpose computer system 112 is shown in FIG. 1.

In general, computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 of FIG. 1 is an alphanumeric input device 106 including alphanumeric and function keys coupled to the bus 100 for communicating information and command selections to the central processor 101. System 112 also includes a cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. Computer system 112 can also include an optional signal generating device 108 coupled to the bus 100 for interfacing with other networked computer systems. The display device 105 utilized with the computer system 112 of the present invention may be a liquid crystal device, cathode ray tube (CRT), light emitting diode (LED), field emission device (FED, also called flat panel CRT) or other display device suitable for creating graphic images and alphanumeric characters recognizable to the user.

Semi-Transparent Scroll Bar Tools of the Present Invention

The present invention includes a semi-transparent scroll bar graphical user interface tool for a window-based application program, e.g., a word processor, internet browser, electronic spreadsheet, drawing application, electronic mail program, etc. The window-based application program includes a window area displayed on the display screen 105 (FIG. 1) in which information pertaining to an open or active document (e.g., file) are displayed. In accordance with the present invention, the semi-transparent scroll bar graphical user interface tools are also displayed within the window area thereby increasing the total usable display screen area.

The semi-transparent scroll bar graphical user interface tools allow graphic images, including text images, of the document to be viewed therethrough. By allowing this advantageous feature, the effective viewable (e.g., usable) area of the display screen is increased to include those areas that coincide with the scroll bar graphical user interface tools ("scroll bar tools"). This is particularly advantageous for electronic systems that have small display screens, e.g., personal digital assistants, portable computer systems (e.g., laptops, palm sized), and portable consumer based electronic devices.

In the prior art, the scroll bar tools are not transparent nor semi-transparent and therefore require their own display area. Therefore, prior art scroll bar tool designs require a separate display area. That is to say, in the prior art there is a "window area" in which document information is displayed and a separate, different area, (called the "tool area") in which the scroll bar tools are displayed. Every part of the "tool area" of the prior art reduces the amount of display area available on the display unit 105 for the display of document information. In effect, every part of the "tool area" reduces in kind the available size of the window area in the prior art.

However, in accordance with the present invention, the scroll bar tools are semi-transparent thereby allowing information of the document to be viewed therethrough. This effectively allows the scroll bar tools to be incorporated or merged directly within the window area and a separate tool area is thereby avoided.

FIG. 2 illustrates a diagram of a window area 212 in accordance with the present invention. It is appreciated that the window area 212 is generated by computer system 112 and displayed on its display screen 105. As shown in this configuration, the open or active document 210a is smaller in area than the window area 212. In this configuration, no scroll bar tools are displayed because no scrolling is possible. It is appreciated that in an alternative embodiment of the present invention, the scroll bar tools can also be displayed in the configuration of FIG. 2, but would be of limited use until the document size exceeds the window area 212.

Figure 3A:
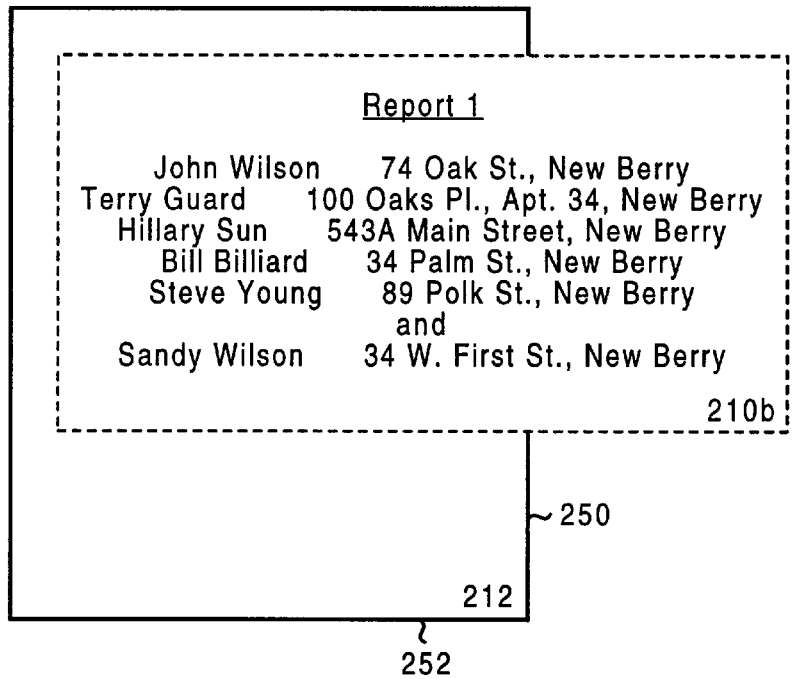
FIG. 3A is a logical diagram of a window area in accordance with the present invention with a document exceeding a vertical edge of the window area.

FIG. 3A illustrates a logical diagram including the window area 212 and the area required by an open or active document 210b that is wider than the width of the window area 212. The information incorporated within document 210b is exemplary only. It is appreciated that the window area 212 is generated by computer system 112 and displayed on its display screen 105. In this case, the document 210b exceeds the vertical edge 250 of the window area 212.

Figure 3B:
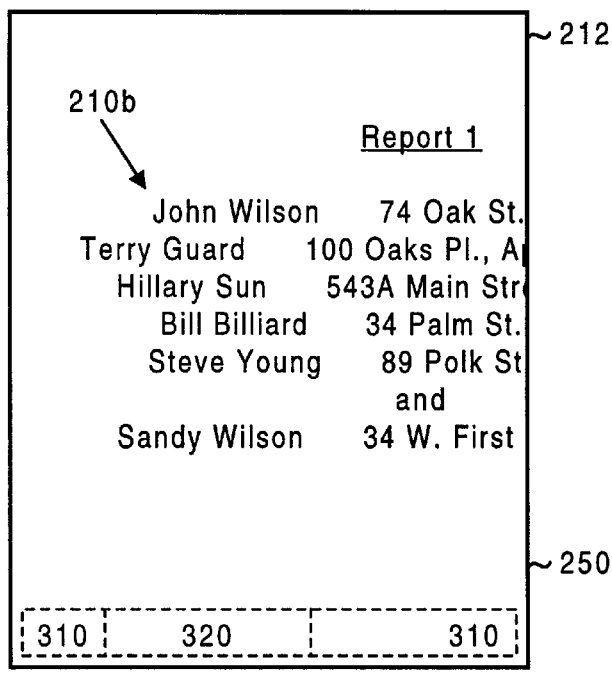
FIG. 3B is a rendition of the configuration of FIG. 3A as displayed on a computer screen and illustrating a semi-transparent scroll bar tool of the present invention.

FIG. 3B illustrates the result of the configuration of FIG. 3A as displayed on display screen 105 and as viewable by a user. The document 210b is only partially displayed within window area 212. Because the document 210b exceeds the vertical edge 250 of window 212, a horizontal scroll bar tool 310 becomes displayed. The horizontal scroll bar tool 310 includes a button image 320 that can slide left and right within scroll bar 310. Within the present invention the scroll bar tool 310 (including the button image 320) is semi-transparent and allows images associated with the document 210b to be viewed therethrough. The button image 320 can be user-activated by a cursor image and dragged left and right along the scroll bar tool 310 causing the window area 212 to scroll horizontally through different portions of the document 210b. Using this technique, different parts of the document 210b can be displayed within window area 212 and thereby become accessible by a user. It is appreciated that in an alternate embodiment of the present invention, the configuration of FIG. 3A can cause the vertical scroll bar tool 330 to become displayed. However, because the document 210b does not exceed the horizontal window edge 252 in this configuration, no vertical scrolling is possible and therefore the vertical scroll bar tool 310 is of limited use.

FIG. 4A illustrates a logical diagram including the window area 212 and the area required by an open or active document 210c that is longer than the length of the window area 212. The information incorporated within document 210c is exemplary only. It is appreciated that the window area 212 is generated by computer system 112 and displayed on its display screen 105. In this case, the document 210c exceeds the horizontal edge 252 of the window area 212.

FIG. 4B illustrates the result of the configuration of FIG. 4A as displayed on display screen 105 and as viewable by a user. The document 210c is only partially displayed within window area 212. Because the document 210c exceeds the horizontal edge 252 of window 212, a vertical scroll bar tool 330 becomes displayed. The vertical scroll bar tool 330 includes a button image 340 that can slide up and down within scroll bar 330. Within the-present invention the scroll bar tool 330 (including the button image 340) is semi-transparent and allows images associated with the document 210c to be viewed therethrough. The button image 340 can be user-activated by a cursor image and dragged up and down along the scroll bar tool 330 causing the window area 212 to vertically scroll through different portions of the document 210c. Using this technique, different parts of the document 210c can be displayed within window area 212 and thereby become accessible by a user. It is appreciated that in an alternate embodiment of the present invention, the configuration of FIG. 4A can cause the horizontal scroll bar tool 310 to become displayed. However, because the document 210c does not exceed the vertical window edge 250 in this configuration, no horizontal scrolling is possible and therefore the horizontal scroll bar tool 310 is of limited use.

Figure 5A:
FIG. 5A is a logical diagram of a window area in accordance with the present invention with a document exceeding both the horizontal and vertical edges of the window area.

FIG. 5A illustrates a logical diagram including the window area 212 and the area required by an open or active document 210d. This configuration causes both the vertical 330 and the horizontal 310 scroll bar tools to become displayed. The active document 210d is longer than the length of the window area 212 and wider than the width of the window area 212. The information incorporated within document 210d is exemplary only and, as shown, has text images that are displayed up against the vertical edge 250 and the horizontal edge 252 of the window area 212. It is appreciated that the window area 212 is generated by computer system 112 and displayed on its display screen 105. In this case, the document 210d exceeds the horizontal edge 252 of the window area 212 and the vertical edge 250 of the window area 212.

Figure 5B:
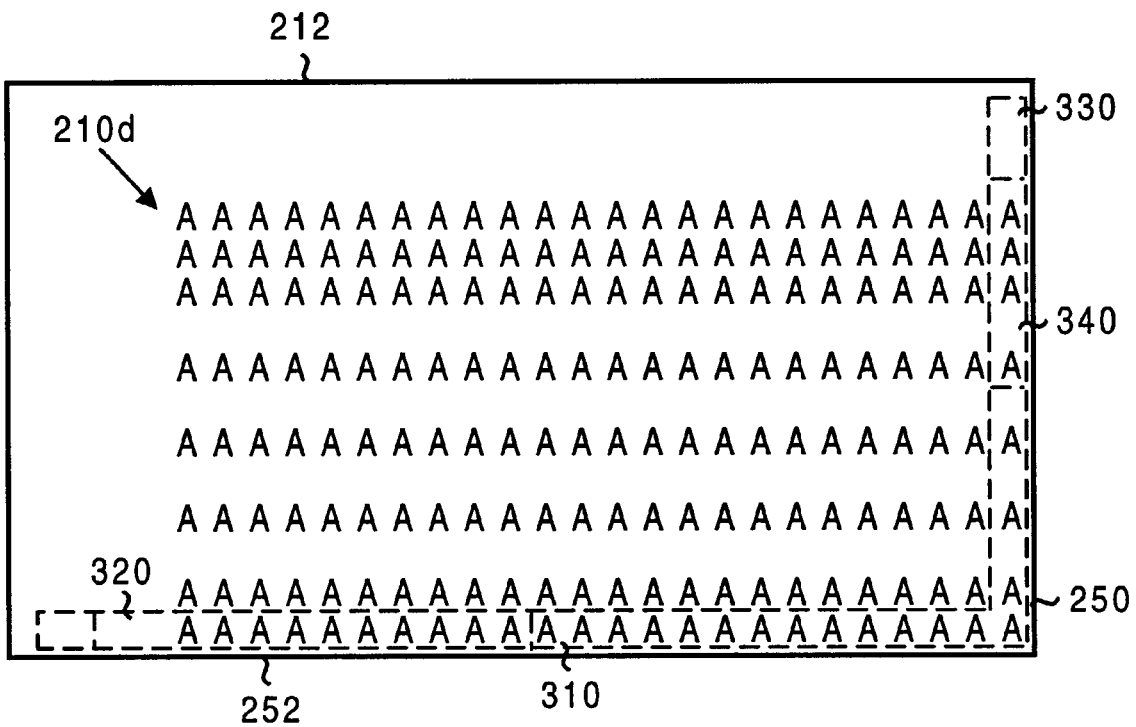
FIG. 5B is a rendition of the configuration of FIG. 5A as displayed on a computer screen and illustrating the semi-transparent scroll bar tools of the present invention.

FIG. 5B illustrates the result of the configuration of FIG. 5A as displayed on display screen 105 and as viewable by a user. The document 210d is only partially displayed within window area 212. Because the document 210d exceeds the horizontal edge 252 and the vertical edge 250 of window 212, the vertical scroll bar tool 330 becomes displayed and the horizontal scroll bar tool 310 becomes displayed. The vertical scroll bar tool 330 includes a button image 340 that can slide up and down within scroll bar 330 to effect vertical scrolling. The horizontal scroll bar tool 310 includes a button image 320 that can slide left and right within scroll bar 310 to effect horizontal scrolling.

Within the present invention, the scroll bar tool 330 (including the button image 340) and the scroll bar tool 310 (including the button image 320) are all semi-transparent and allow images associated with the document 210d to be viewed therethrough. As shown in FIG. 5B, as an example, the text images from document 210d can be clearly seen through the scroll bar tools 310 and 330 and their associated button images 320 and 240. The button image 340 can be useractivated by a cursor image and dragged up and down along the scroll bar tool 330 causing the window area 212 to vertically scroll through different portions of the document 210d. Likewise, the button image 320 can be user-activated by a cursor image and dragged right and left along the scroll bar tool 310 causing the window area 212 to horizontally scroll through different portions of the document 210d. Using this technique, different parts of the document 210d can be displayed within window area 212 and thereby become accessible by a user. Since the upper left corner of document 210d is displayed within window area 212, the button images 320 and 340 are generally located to the left and upward, respectively, to allow scrolling downward and to the right.

There are a number of different mechanisms that can be used to display the semi-transparent scroll bar tools 310 and 330 in accordance with the present invention. Exemplary methods are described herein. In one embodiment, the semi-transparent scroll bar tools 310 and 330 are displayed in a light color scheme rasterized such that graphic images of the open document can viewed therethrough. Although a variety of different mechanisms can be used to generate a semi-transparent graphic image, one method of generating a semi-transparent graphic object is described in U.S. Pat. No. 5,283,560 issued on Feb. 1, 1994 to Bartlett, which is incorporated herein by reference. In another embodiment, the semi-transparent scroll bar tools 310 and 330 are displayed in outline form where their graphic images are only their outlines. The outline and the inner portions of the semi-transparent scroll bar tools 310 and 330 are transparent.

Figure 6A:
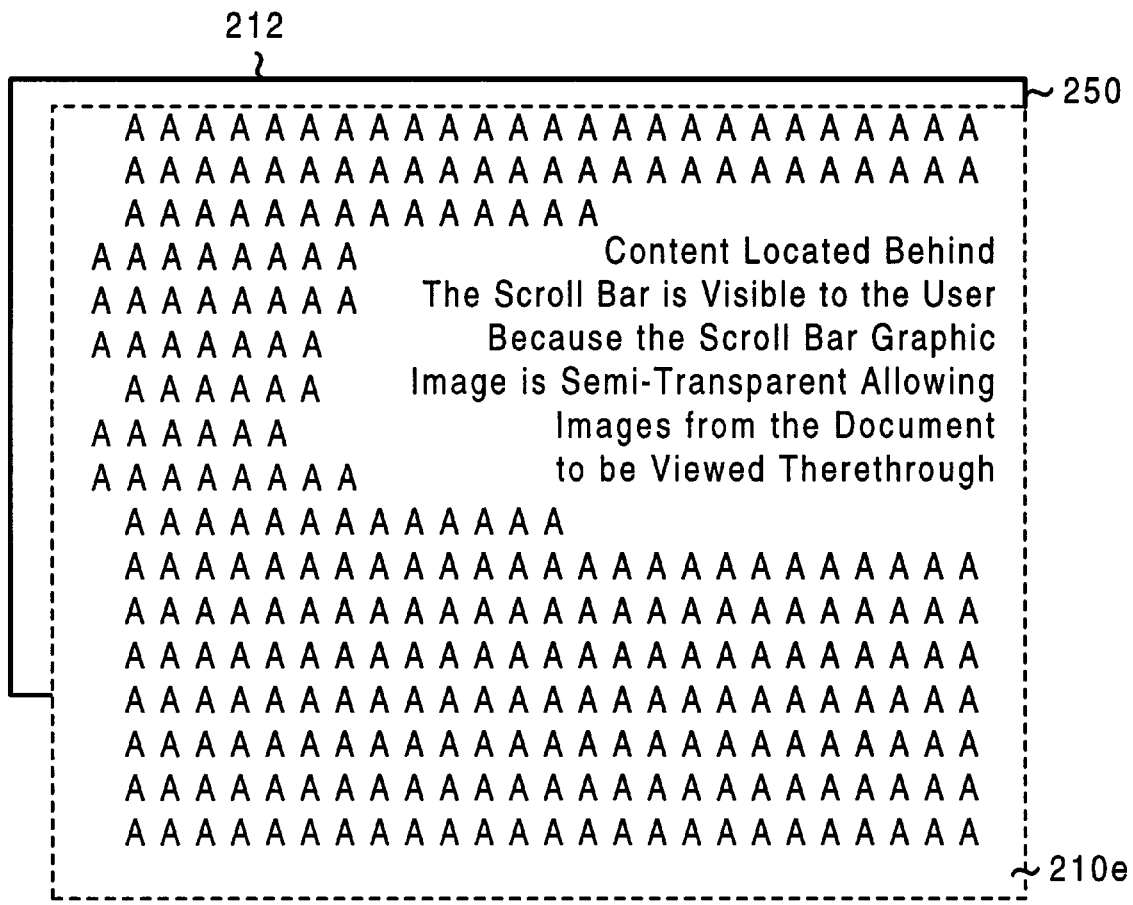
FIG. 6A is a logical diagram of a window area in accordance with the present invention with a document exceeding the horizontal edge of the window area and having images (e.g., text) up against the vertical edge of the window area.
Figure 6B:
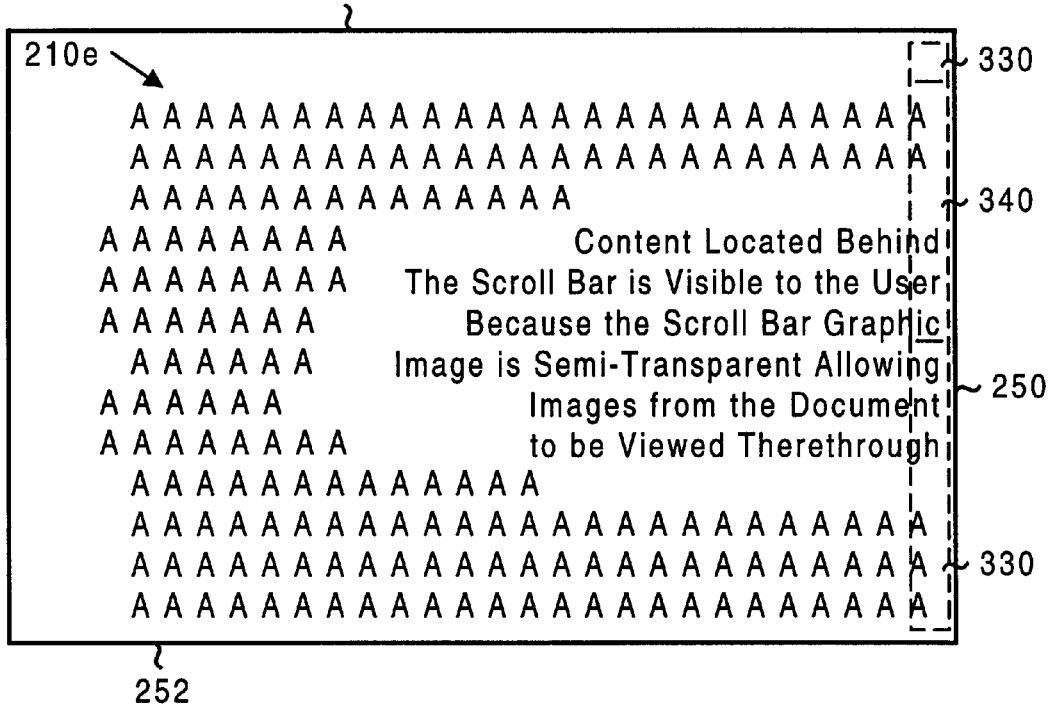
FIG. 6B is a rendition of the configuration of FIG. 6A as displayed on a computer screen and illustrating that images of the document are displayed through the semi-transparent scroll bar tool in accordance with the present invention.

FIG. 6A and FIG. 6B are similar to FIG. 4A and FIG. 4B, respectively, except that, in FIG. 6A, the document 210e contains exemplary graphic images that are up against the vertical edge 250 of the window area 212. In this case, FIG. 6B illustrates the result of the display screen 105. As shown, the images of the document 210e are clearly viewable through the vertical scroll bar tool 330 and its associated button image 340. As described with respect to FIG. 4A and FIG. 4B, the scroll bar tool 330 can be used to effect vertical scrolling of document 210e and remains semi-transparent during scrolling operations. The present invention effectively increases the usable area of the display screen 105 by increasing its area that can be used to display information within a window area 212. The usable area is increased to include those areas used for displaying the scroll bar tools.

Figure 7A:
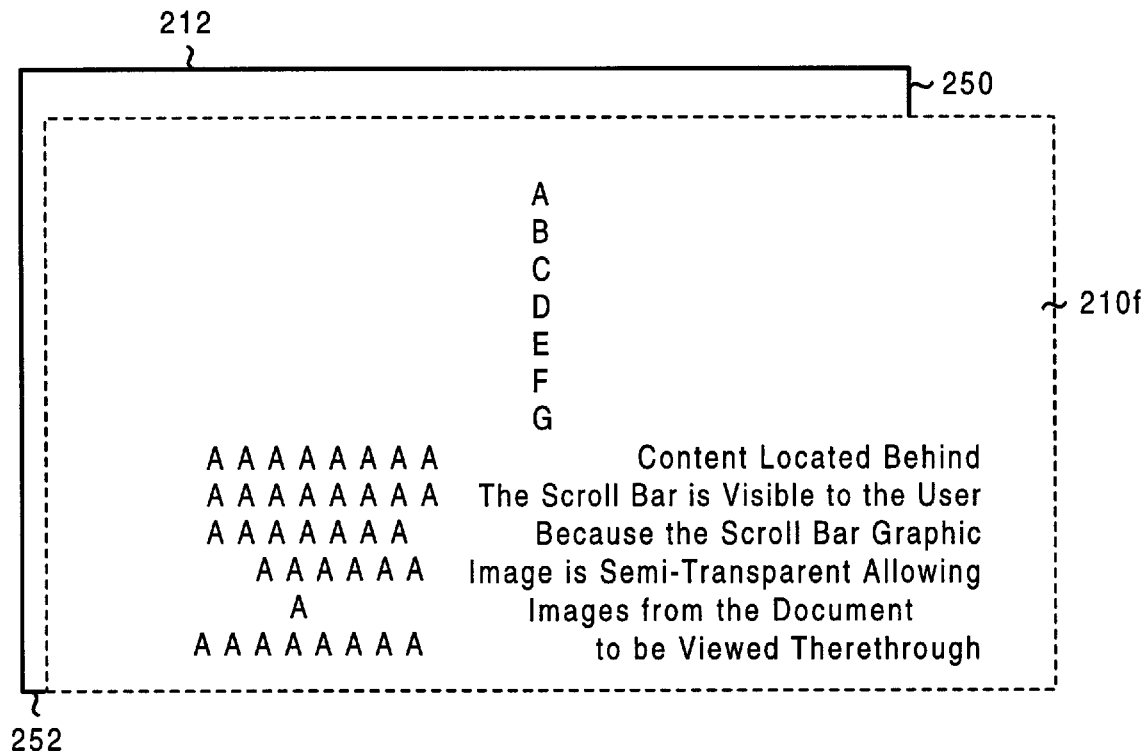
FIG. 7A is a logical diagram of a window area in accordance with the present invention with a document exceeding the vertical edge of the window area and having images (e.g., text) up against the horizontal edge of the window area.
Figure 7B:
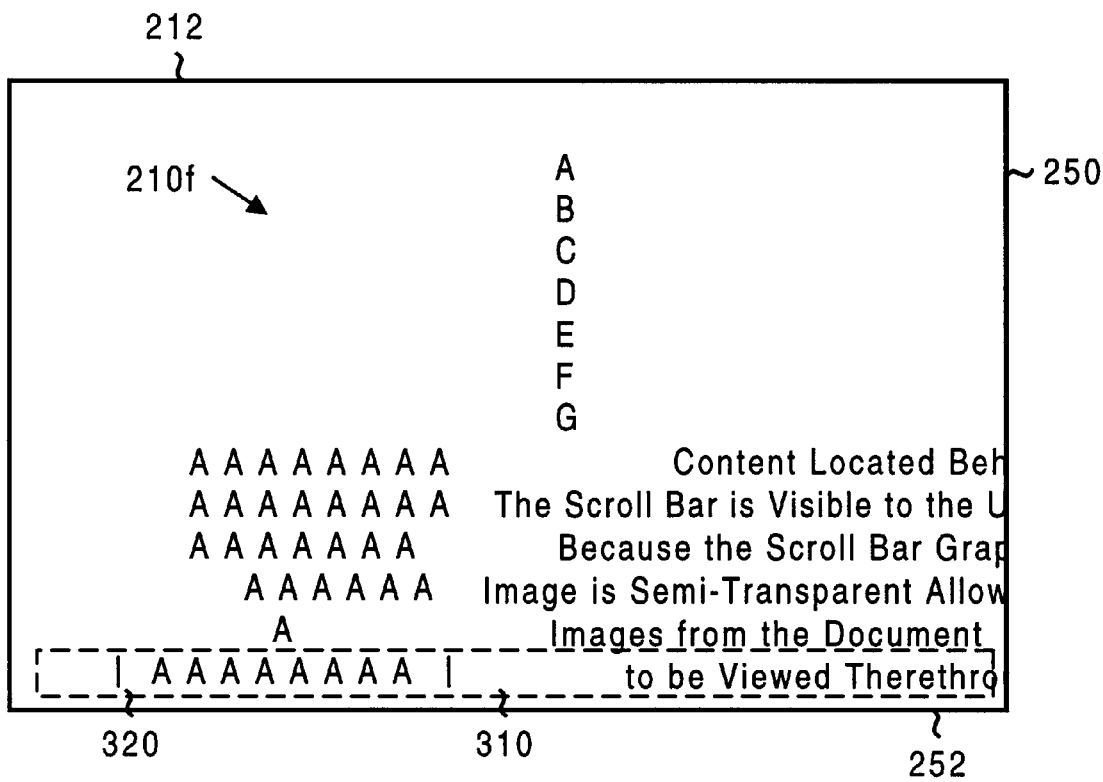
FIG. 7B is a rendition of the configuration of FIG. 7A as displayed on a computer screen and illustrating that images of the document are displayed through the semi-transparent scroll bar tool in accordance with the present invention.

FIG. 7A and FIG. 7B are similar to FIG. 3A and FIG. 3B, respectively, except that, in FIG. 7A, the document 210f contains exemplary graphic images that are up against the horizontal edge 252 of the window area 212. In this case, FIG. 7B illustrates the result of the display screen 105. As shown, the images of the document 210f are clearly viewable through the horizontal scroll bar tool 310 and its associated button image 320. As described with respect to FIG. 3A and FIG. 3B, the scroll bar tool 310 can be used to effect horizontal scrolling of document 210f and remains semi-transparent during scrolling operations. The present invention effectively increases the usable area of the display screen 105 by increasing its area that can be used to display information within a window area 212. The usable area is increased to include those areas used for displaying the scroll bar tools.

Figure 8:
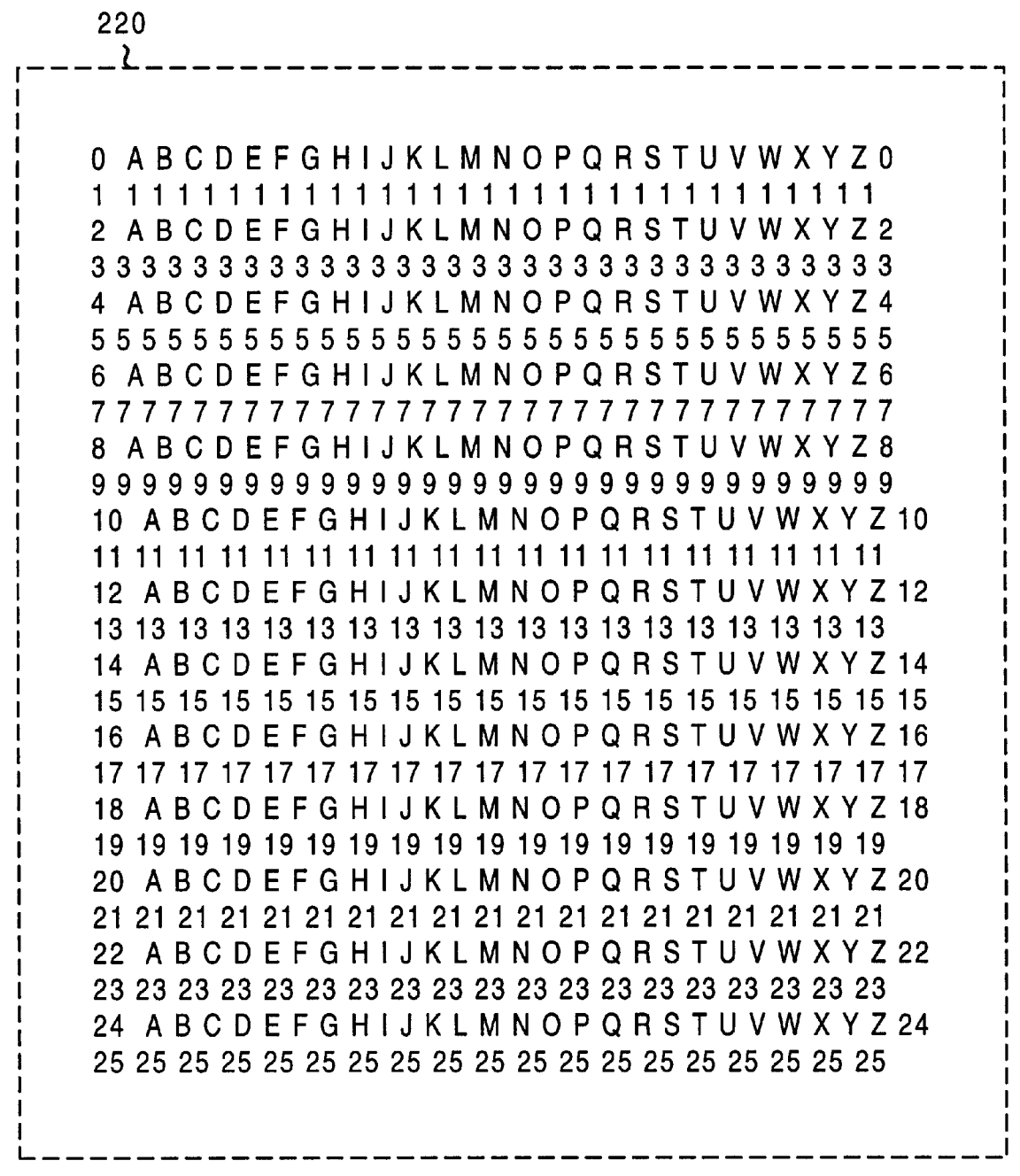

FIG. 8 illustrates an exemplary document 220 that is used to illustrate the relationship between a scrolling operation and the movement of the corresponding button images in accordance with the present invention. The information of document 220 is presented in such a manner that any of its area displayed within a sample window area will be uniquely identified.

Figure 9A:
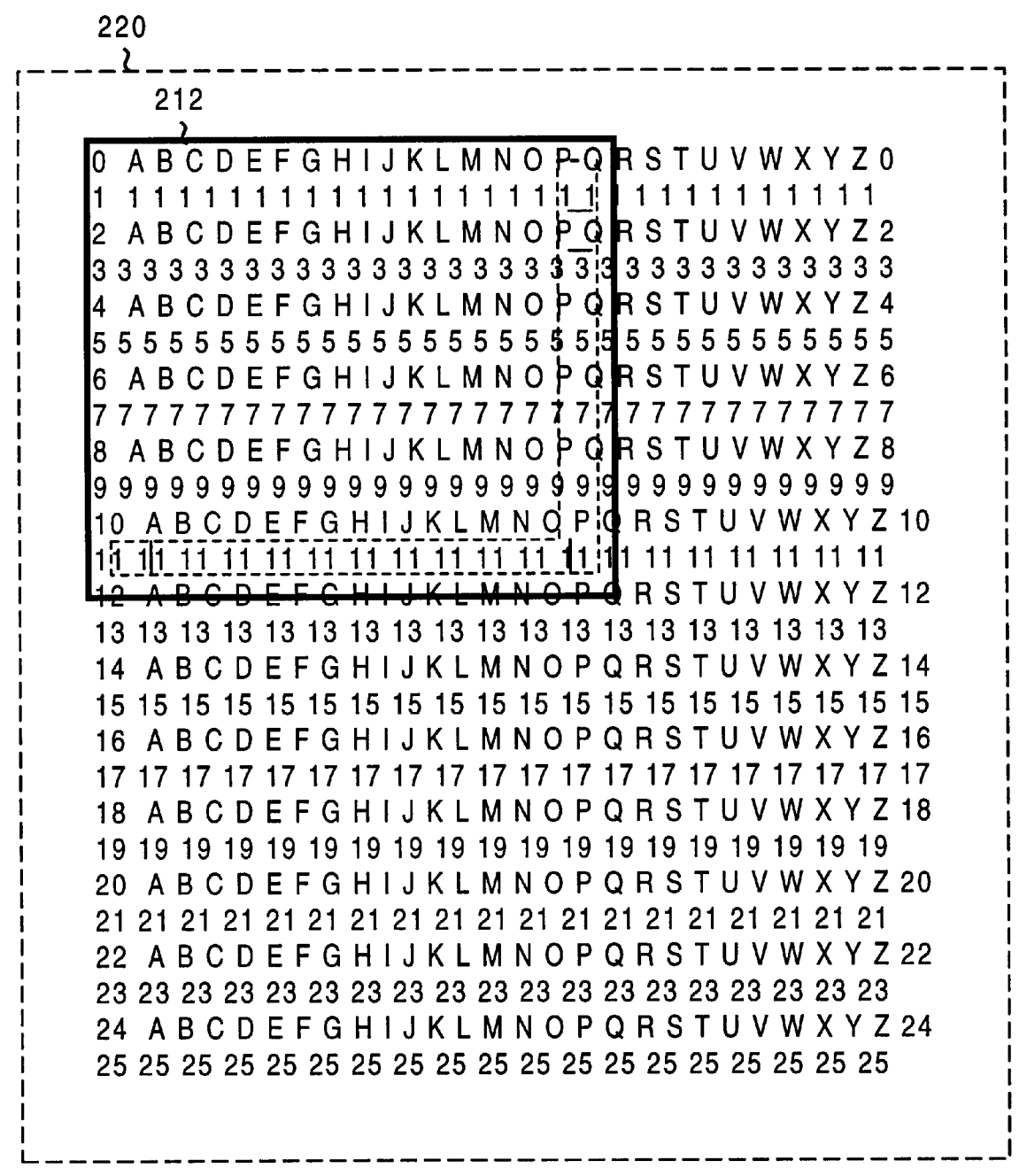
Figures 10A, 10B:
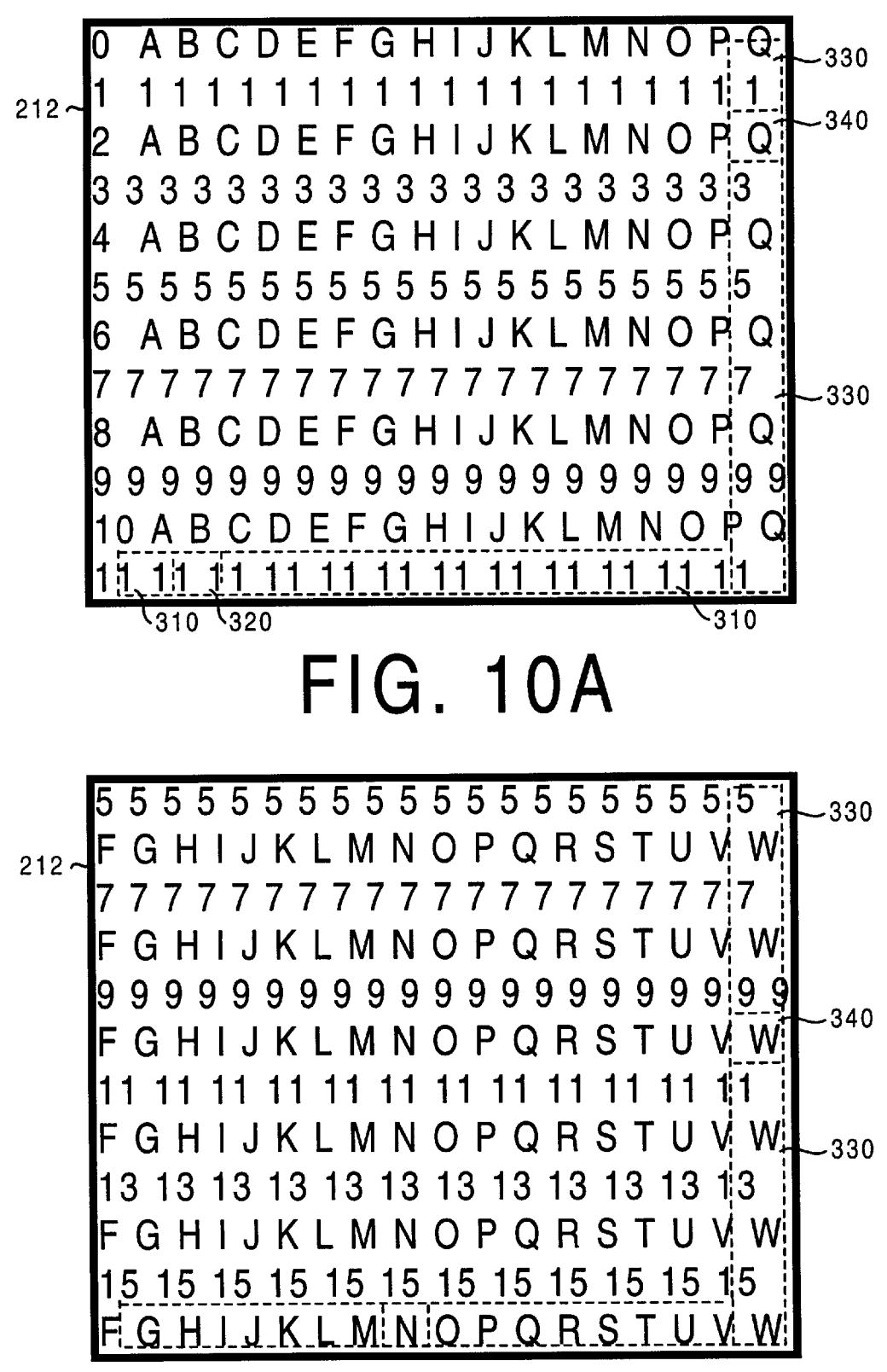

FIG. 9A is a logical diagram illustrating a window area 212, with semi-transparent vertical and horizontal scroll bar tools, positioned in a first scroll position over the exemplary document 220. The first scroll position is located in the upper left hand corner of document 220. FIG. 10A illustrates the corresponding display image seen on display screen 105. Vertical scroll bar tool 330 is shown with associated button image 340. Horizontal scroll bar tool 310 is shown with associated button image 320. As shown, both vertical 330 and horizontal 310 scroll bar tools are semi-transparent to allow the display therethrough of images associated with the document 220. In the first scroll position, the button images 340 and 320 are located to the top and to the left, respectively, to allow bottom and right scrolling operations.

Figure 9B:
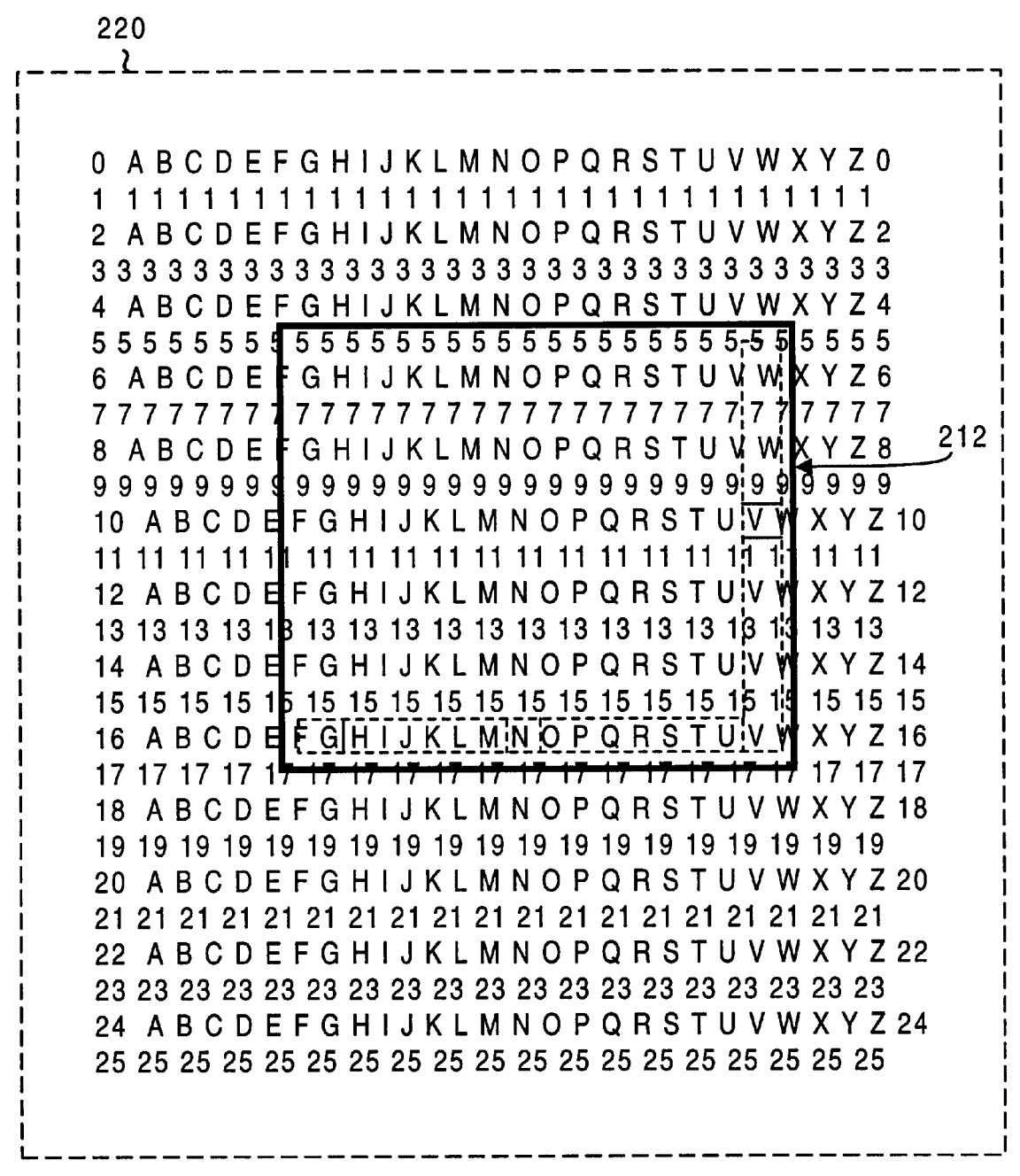

FIG. 9B is a logical diagram illustrating the window area 212, with semi-transparent vertical and horizontal scroll bar tools, positioned in a second scroll position over the exemplary document 220. The second scroll position is located down and to the right from the first position (FIG. 9A). This second position is reached by using the vertical scroll bar tool 330 to scroll down and using the horizontal scroll bar tool 310 to scroll right from the first scroll position. This is performed by user interaction, via the cursor, with the button image 340 (e.g., dragging down the button image 340) and with the button image 320 (e.g., dragging right the button image 320). FIG. 10B illustrates the corresponding display image seen on display screen 105. Vertical scroll bar tool 330 is shown with associated button image 340. Horizontal scroll bar tool 310 is shown with associated button image 320. As shown, both vertical 330 and horizontal 310 scroll bar tools are semi-transparent to allow the display therethrough of images associated with the document 220. In the second scroll position, the button images 340 and 320 are located in the central positions of their respective scroll bar tools since the center portion of the document 220 is being viewed.

Figure 9C:
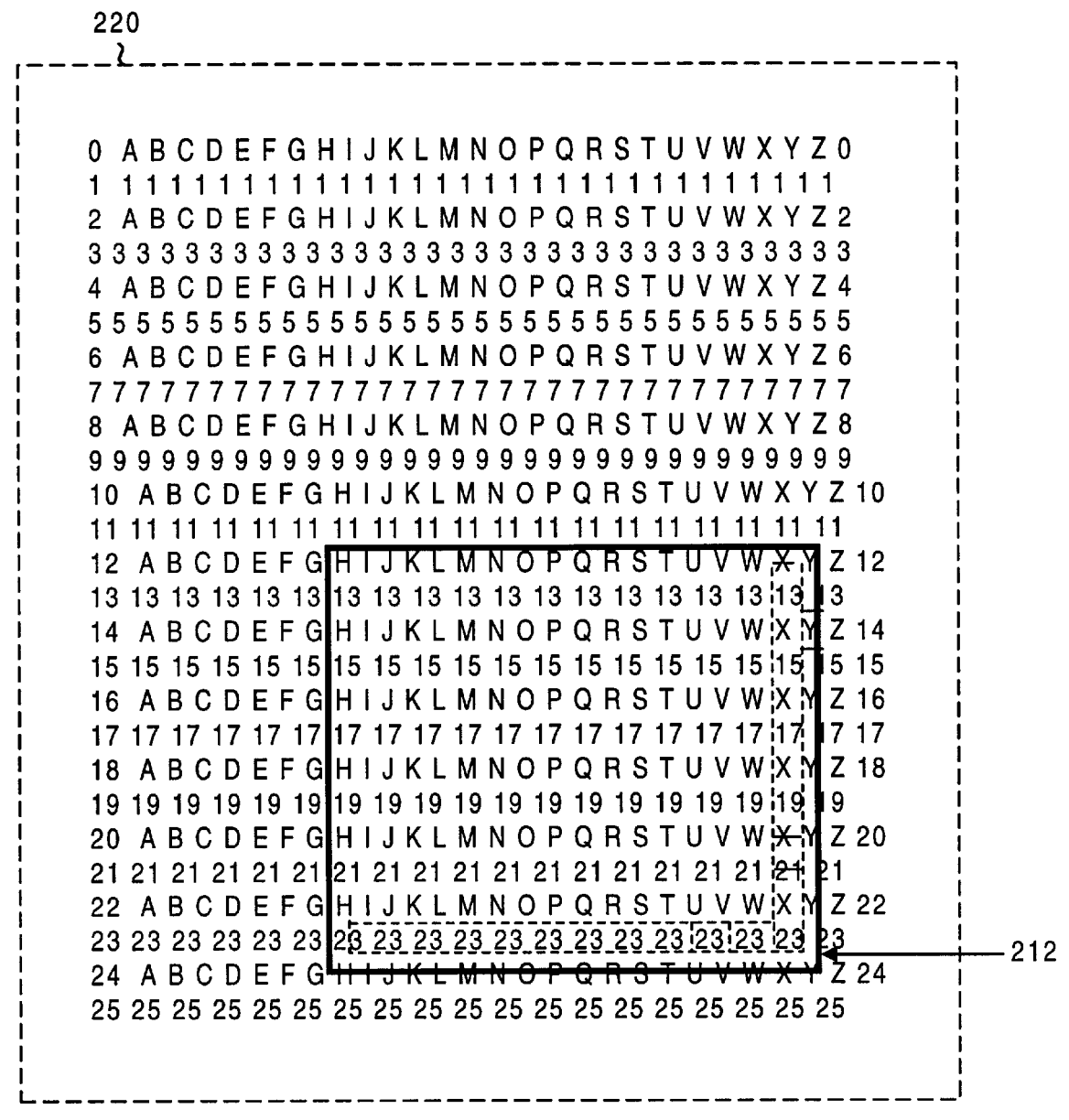

FIG. 9C is a logical diagram illustrating the window area 212, with semi-transparent vertical and horizontal scroll bar tools, positioned in a third scroll position over the exemplary document 220. The third scroll position is located down and to the right from the second position (FIG. 9B). This third position is reached by using the vertical scroll bar tool 330 to scroll down and using the horizontal scroll bar tool 310 to scroll right from the second scroll position. This is performed by user interaction, via the cursor, with the button image 340 (e.g., dragging down the button image 340) and with the button image 320 (e.g., dragging right the button image 320). FIG. 10C illustrates the corresponding display image seen on display screen 105. Vertical scroll bar tool 330 is shown with associated button image 340. Horizontal scroll bar tool 310 is shown with associated button image 320. As shown, both vertical 330 and horizontal 310 scroll bar tools are semi-transparent to allow the display therethrough of images associated with the document 220. In the third scroll position, the button images 340 and 320 are located down and to the right, respectively, since the lower right corner of the document 220 is being viewed.

Figure 9D:
FIG. 9D is a logical diagram illustrating the window area of the present invention, with semi-transparent scroll bars, positioned in a fourth scroll position over the exemplary document of FIG. 8.

FIG. 9D is a logical diagram illustrating the window area 212, with semi-transparent vertical and horizontal scroll bar tools, positioned in a fourth scroll position over the exemplary document 220. The fourth scroll position is located down from the first position (FIG. 9A). This fourth position is reached by using the vertical scroll bar tool 330 to scroll down. This is performed by user interaction, via the cursor, with the button image 340 (e.g., dragging down the button image 340). FIG. 10D illustrates the corresponding display image seen on display screen 105. Vertical scroll bar tool 330 is shown with associated button image 340. Horizontal scroll bar tool 310 is shown with associated button image 320. As shown, both vertical 330 and horizontal 310 scroll bar tools are semi-transparent to allow the display therethrough of images associated with the document 220. In the fourth scroll position, the button images 340 and 320 are located down and to the left, respectively, since the lower left corner of the document 220 is being viewed.

Figure 11A:
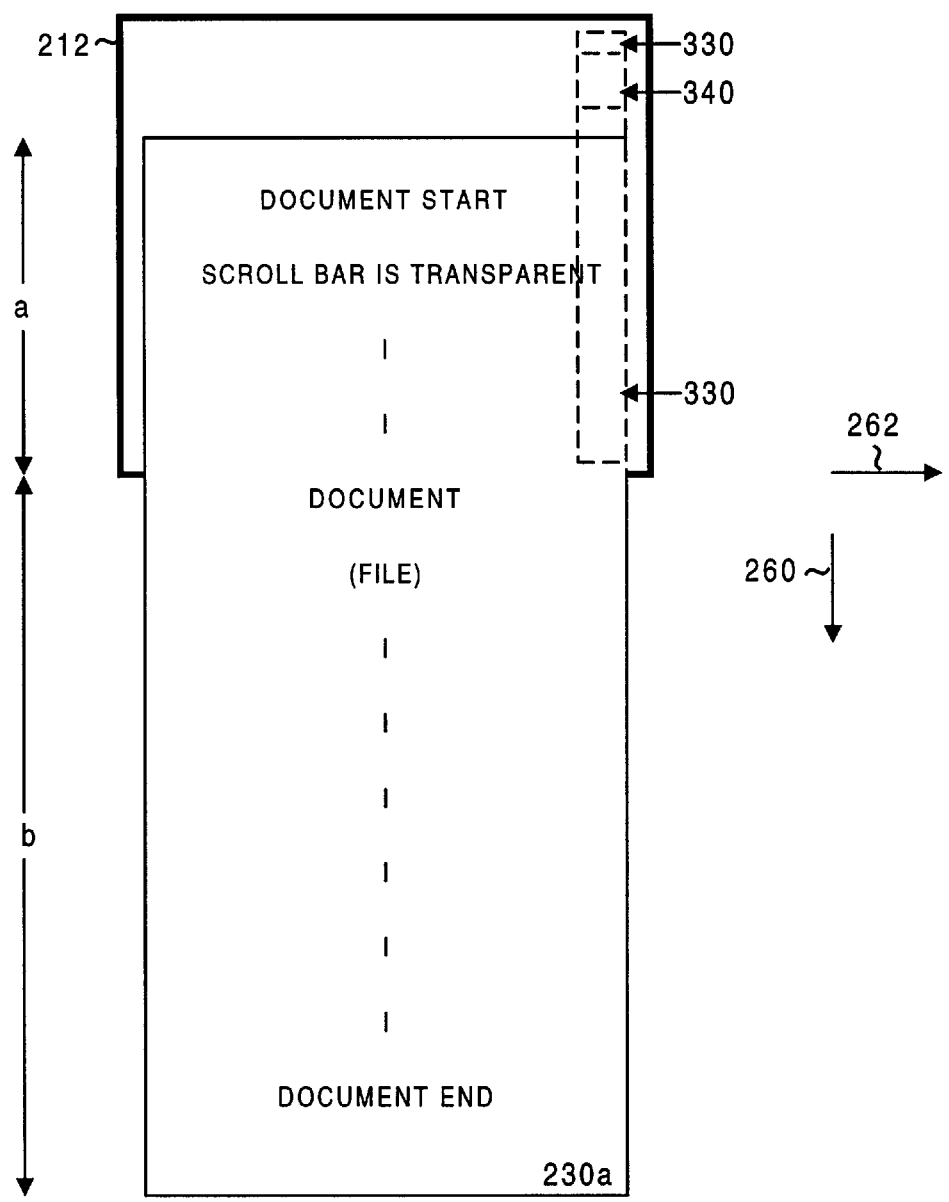
FIG. 11A is a logical diagram of a document that mostly extends outside the window area and the corresponding small button size that results from this configuration in one embodiment of the present invention.
Figure 11B:
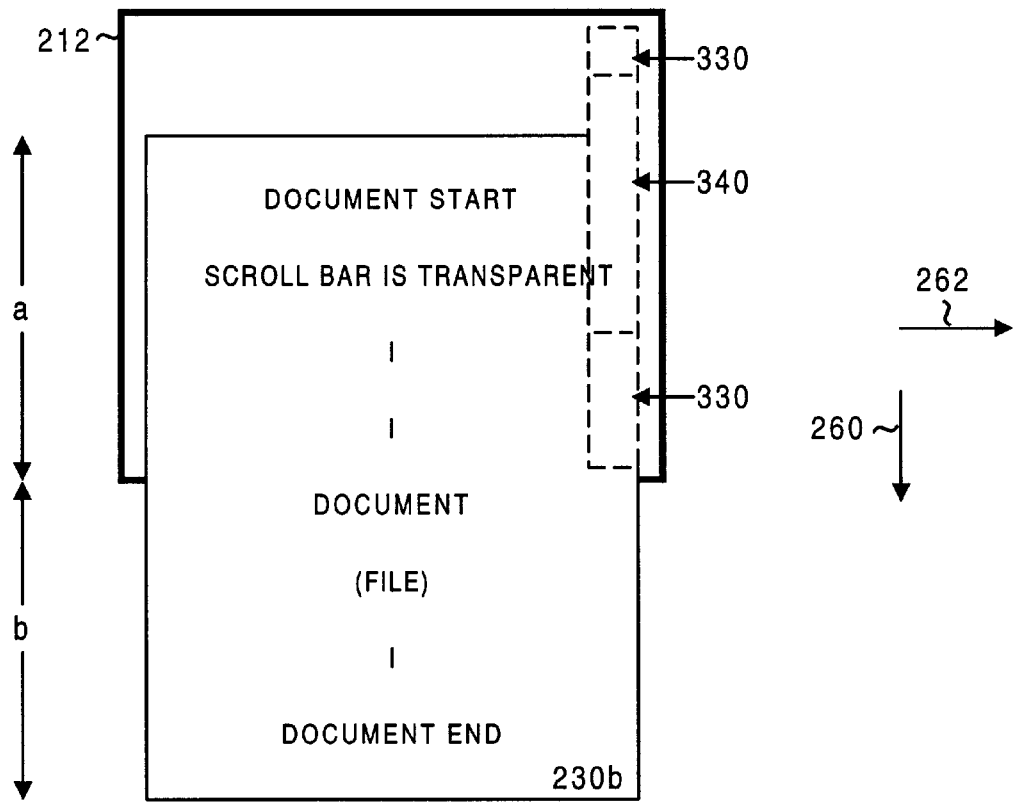
FIG. 11B is a logical diagram of a document that largely lies within the window area and the corresponding larger button-size that results from this configuration in one embodiment of the present invention.

FIG. 11A and FIG. 11B illustrate a feature of an embodiment of the present invention where the size of the button image varies depending on the proportion of the active document within the window area to the total size of the active document. FIG. 11A is a logical diagram illustrating an exemplary document 230a that is relatively long with respect to the length of the window area 212, but within the width of the window area 212. In this configuration, the amount, a, of document 230a along the vertical direction 260 that is inside of window area 212 is small in proportion to the total amount, a+b, of document 230a along the vertical direction 260. Therefore, the relative size of the button image 340 is small.

As shown in FIG. 11B, as the amount, a, becomes a relatively larger percentage to the total (a+b), the size of the button image 340 increases. FIG. 11B is a logical diagram illustrating an exemplary document 230b that is not much longer than the length of the window area 212 and within the width of the window area 212. In this configuration, the amount, a, of document 230b along the vertical direction 260 that is inside of window area 212 is large in proportion to the total amount, a+b, of document 230b along the vertical direction 260. Therefore, the relative size of the button image 340 is large. In view of the above examples it can be seen that the size of the button image 340 is proportional to the relationship between the amount, a, divided by the amount (a+b). The above is also true with respect to the size of button image 320 but with respect to document sizes measured along the horizontal direction 262.

Figure 12A:
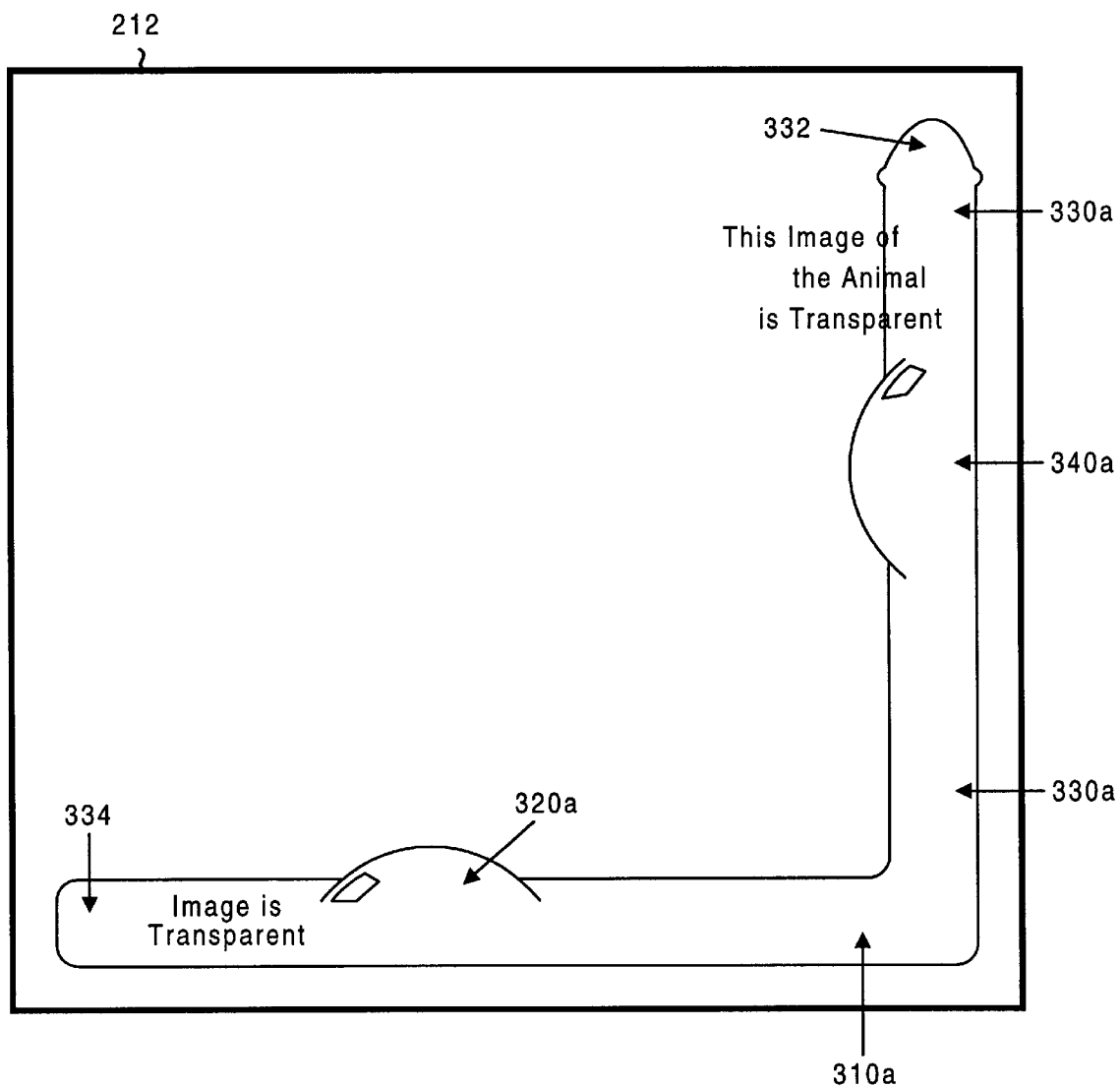
FIG. 12A and FIG. 12B illustrate embodiments of the present invention wherein the scroll bar tool takes on the image of an animal but remains semi-transparent and bulges of food within the animal represent the scroll bar buttons.
Figure 12B:
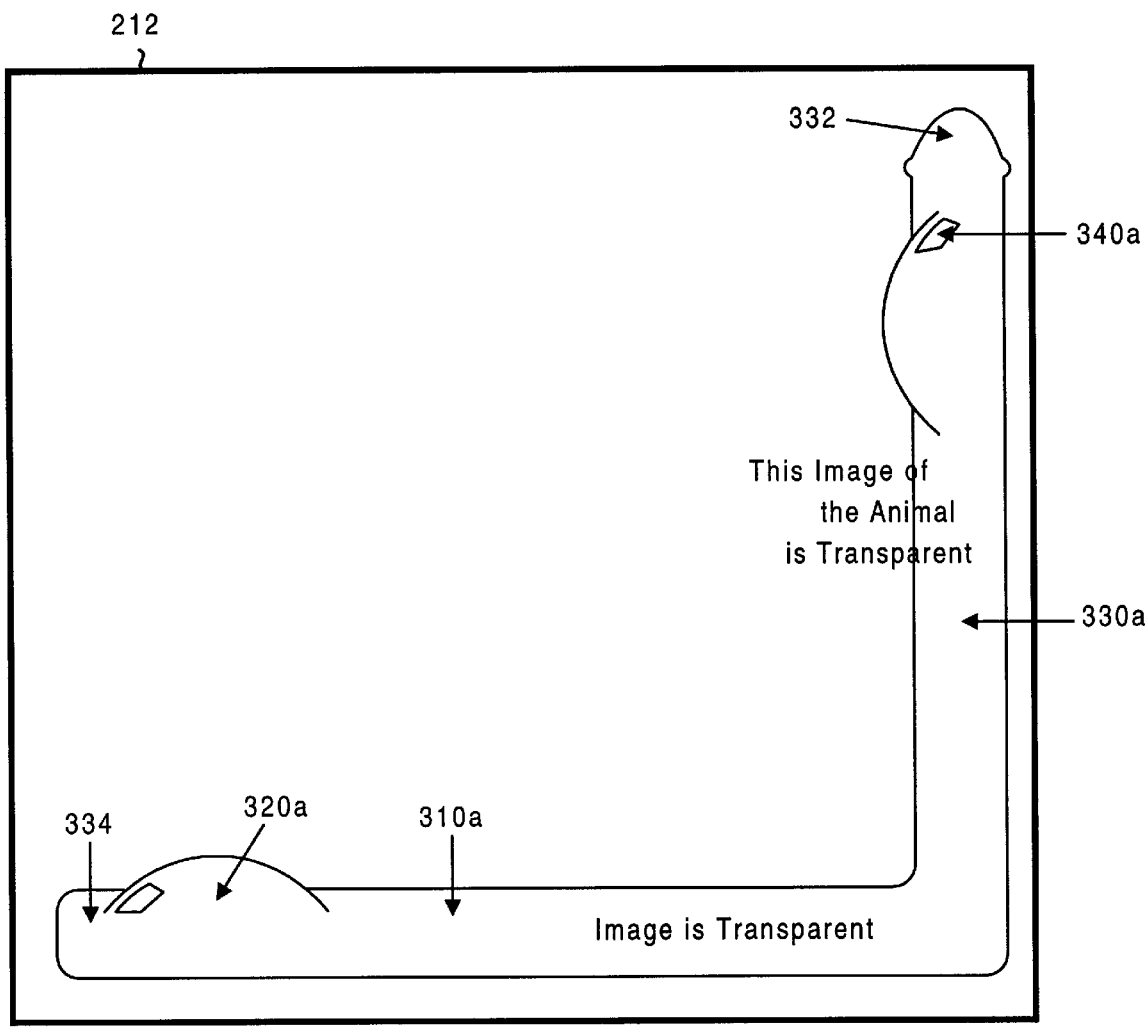

FIG. 12A and FIG. 12B illustrate that in one particular embodiment of the present invention, the scroll bar tools taken on the shape of an animal, e.g., a snake. In FIG. 12A, a three dimensional image of a snake body is shown. Along the vertical, scroll bar tool 330a is shown as part of the snake body including a snake head 332. The snake body wraps around the lower right corner of window area 212 to form the scroll bar tool 310a which includes a tail section 334. The button image 340a is a three dimensional image of a bulge of food within the snake body and can move up and down over the length of the scroll bar tool 330a. The button image 320a is a three dimensional image of a bulge of food within the snake body and can move right and left over the length of the scroll bar tool 310a. As described above, the scroll bar tool 310a (including bulge 320a) and the scroll bar tool 330a (including bulge 340a) are all semi-transparent allowing document information to be visualized therethrough as shown in FIG. 12A.

FIG. 12B illustrates another example of this embodiment of the present invention where the bulge images 340a and 320a are of smaller size and shown in different locations. The semi-transparent scroll bar tools 310a and 330a of FIG. 12A and FIG. 12B (and their related bulge images) operate as described above with respect to scroll bar tools 310 and 330 and button images 320 and 340, respectively.

Figure 13:
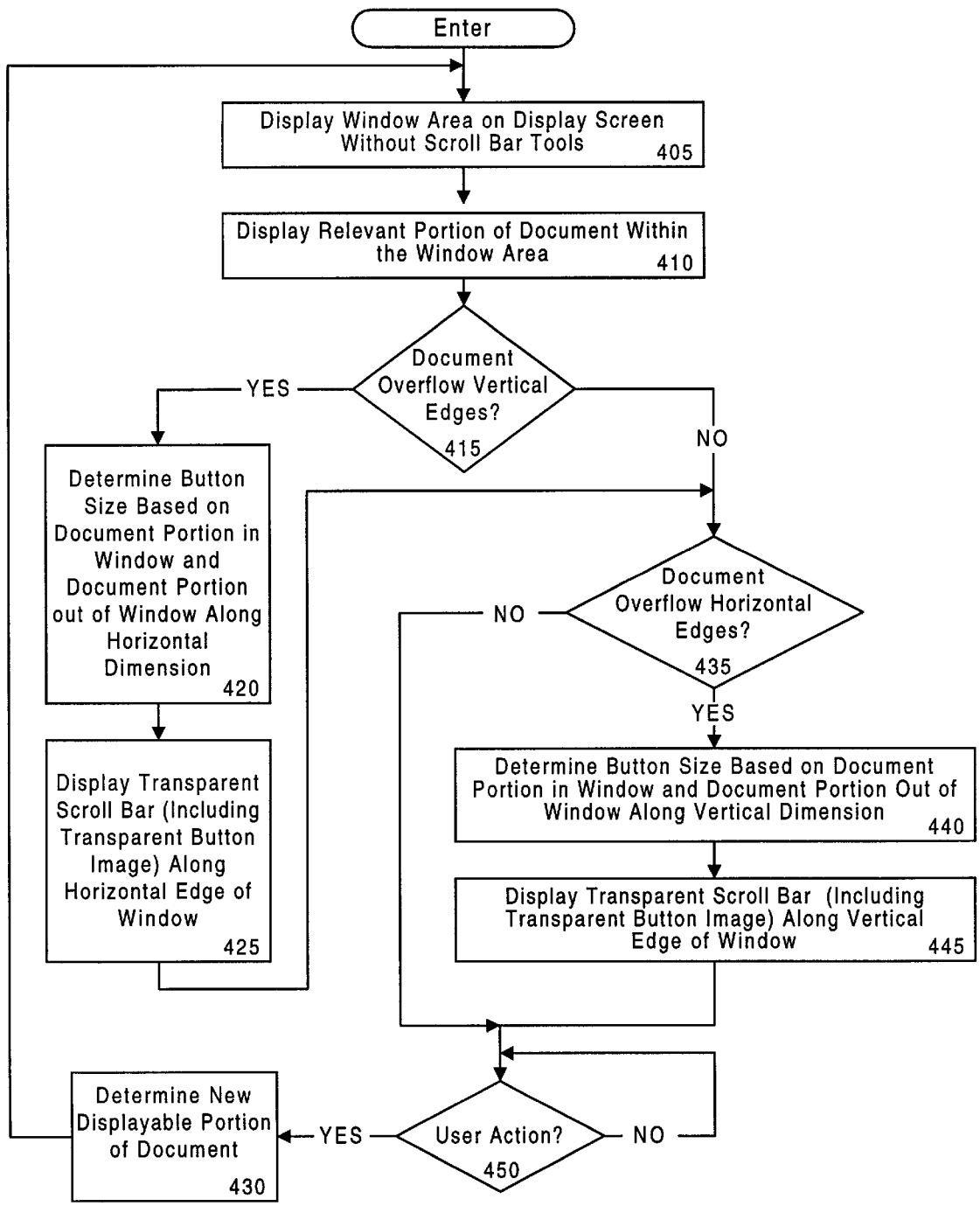
FIG. 13 is a flow diagram of steps performed by one embodiment of the semi-transparent scroll bar tool of the present invention.

FIG. 13 illustrates a flow diagram of steps 400 performed by one embodiment of the present invention for implementing the semi-transparent scroll bar tools. It is appreciated that steps 400 are implemented as program code stored in computer readable memory units of computer system 112. At step 405, the window area of a particular application is displayed on display screen 105 without scroll bar tools. At step 410, the relevant portion of an active document is displaced within the open window area depending on the current scroll position of the window area. In one embodiment, the upper left corner of the document is the default scroll location.

At step 415 a check is made if the document exceeds the vertical edge of the window 212. If so, then at step 420 the present invention determines the appropriate button image size for the horizontal scroll bar tool (using the mechanism of FIG. 12A and FIG. 12B). At step 425, the present invention then displays, on display 105, the semi-transparent horizontal scroll bar tool with semi-transparent button image. At step 435, a check is made if the document exceeds the horizontal edge of the window 212. If so, then at step 440 the present invention determines the appropriate button image size for the vertical scroll bar tool (using the mechanism of FIG. 12A and FIG. 12B). At step 445, the present invention then displays, on display 105, the semi-transparent vertical scroll bar tool with semi-transparent button image.

Step 450 of FIG. 13 is maintained if no user action is taken. A user action in this respect is a user interaction with any of the displayed semi-transparent scroll bar tools in order to alter the current scroll position. Upon a user action, at step 430, the present invention determines a new scroll position and returns step 405.

The preferred embodiment of the present invention, a computer-implemented user interface having semi-transparent scroll bar tools for increased screen usage, is thus described. While the present invention has been described in particular embodiments, it should be appreciated that the present invention should not be construed as limited by such embodiments, but rather construed according to the below claims.

What is claimed is:

1. In a computer system having a processor coupled to a bus, a memory device coupled to said bus and a display screen coupled to said bus, a method of displaying information on said display screen, said method comprising the computer-implemented steps of:
   a) displaying a portion of an information bearing document within a window on said display screen;
   b) displaying a first elongated graphic image along a first edge of said window wherein said first elongated graphic image comprises a first movable graphic image that is semi-transparent;
   c) using said first elongated graphic image, controlling user interactive scrolling of said information bearing document in a first direction, said step c) comprises the step of scrolling said information bearing document in said first direction in response to, and in relative proportion to, a displacement of said first movable graphic image along said first edge of said window;
   d) displaying a second elongated graphic image along a second edge of said window;
   e) using said second elongated graphic image, controlling user interactive scrolling of said information bearing document in a second direction, wherein said first elongated graphic image and said second elongated graphic image are each semi-transparent allowing text and/or other graphic images associated with said information bearing document to be visualized therethrough; and
   f) varying the size of said first movable graphic image depending on a relationship between the portion of information displayed within said window, along said first direction, to the total amount of information within said information bearing document along said first direction.

2. A method as described in claim 1 wherein said first direction is horizontal and wherein said second direction is vertical.

3. A method as described in claim 1 wherein said first movable graphic image is displaced by a user selecting said first movable graphic image and dragging said first movable graphic image.

4. A method as described in claim 1 wherein said first movable graphic image is displaced by a user selecting a portion of said first elongated graphic image other than said first movable graphic image.

5. A method as described in claim 1 wherein said second elongated graphic image comprises a second movable graphic image that is semi-transparent, and wherein said step e) comprises the step of scrolling said information bearing document in said second direction in response to, and in relative proportion to, a displacement of said second movable graphic image along said second edge of said window.

6. An electronic device comprising:
   a processor coupled to a bus;
   a display coupled to said bus;
   a user interface device coupled to said bus; and
   a memory device coupled to said bus, said memory device containing instructions that when executed implement a method of displaying information on said display, said method comprising the computer-implemented steps of:
      a) displaying a portion of an information bearing document within a window on said display;
      b) displaying a first elongated graphic image along a first edge of said window, said first elongated graphic image comprises a first movable graphic image that is semi-transparent and wherein said first elongated graphic image represents a first portion of an animal body and wherein said first movable graphic image represents a bulge of food within said animal body;
      c) using said first elongated graphic image, controlling user interactive scrolling of said information bearing document in a first direction and wherein said step c) comprises the step of scrolling said information bearing document in said first direction in response to, and in relative proportion to, a displacement of said first movable graphic image along said first edge of said window;
      d) displaying a second elongated graphic image along a second edge of said window; and
      e) using said second elongated graphic image, controlling user interactive scrolling of said information bearing document in a second direction, wherein said first elongated graphic image and said second elongated graphic image are each semi-transparent to allow text and/or other graphic images associated with said information bearing document to be visualized therethrough.

7. An electronic device as described in claim 6 wherein said first direction is horizontal and wherein said second direction is vertical.

8. An electronic device as described in claim 6 wherein said second elongated graphic image comprises a second movable graphic image that is semi-transparent, and wherein said step e) comprises the step of scrolling said information bearing document in said second direction in response to, and in relative proportion to, a displacement of said second movable graphic image along said second edge of said window.

9. An electronic device as described in claim 8 wherein said first movable graphic image is displaced by a user selecting said first movable graphic image and dragging said first movable graphic image and wherein said second movable graphic image is displaced by said user selecting said second movable graphic image and dragging said second movable graphic image.

10. An electronic device as described in claim 8 wherein said first movable graphic image is displaced by a user selecting a portion of said first elongated graphic image other than said first movable graphic image and wherein said second movable graphic image is displaced by said user selecting a portion of said second elongated graphic image other than said second movable graphic image.

11. An electronic device as described in claim 6 further comprising the step of f) varying the size of said first movable graphic image depending on a relationship between the portion of information displayed within said window, along said first direction, to the total amount of information within said information bearing document along said first direction.

12. An electronic device as described in claim 8 further comprising the step of g) varying the size of said second movable graphic image depending on a relationship between the portion of information displayed within said window, along said second direction, to the total amount of information within said information bearing document along said second direction.

13. In a computer system, a method of displaying information on a display screen comprising the computer-implemented steps of:

a) displaying a portion of an information bearing document within a window on said display screen;

b) displaying first elongated graphic image along a vertical edge of said window, said first elongated graphic image comprising a first movable graphic image that is semi-transparent, wherein said first elongated graphic image represents a first portion of an animal body and wherein said first movable graphic image represents a bulge of food within said animal body;

c) using said first elongated graphic image, controlling user interactive scrolling of said information bearing document in a vertical direction by scrolling said information bearing document in said vertical direction in response to, and in relative proportion to, a displacement of said first movable graphic image along said vertical edge of said window; and d) displaying a second elongated graphic image representing a second portion of said animal body along a horizontal edge of said window;

e) using said second graphic image, controlling user interactive scrolling of said information bearing document in a horizontal direction, wherein said first and second elongated graphic images are each semi-transparent to allow text and/or other graphic images, associated with said information bearing document, to be visualized therethrough.

14. A method as described in claim 13 wherein said first movable graphic image is displaced by a user selecting said first movable graphic image and dragging said first movable graphic image.

15. A method as described in claim 13 wherein said first movable graphic image is displaced by a user selecting a portion of said first elongated graphic image other than said first movable graphic image.

16. A method as described in claim 13 wherein said second elongated graphic image comprises a second movable graphic image of a bulge of food within said animal body, said second movable graphic image being semi-transparent, and wherein said step e) comprises the step of scrolling said information bearing document in said horizontal direction in response to, and in relative proportion to, a displacement of said second movable graphic image along said horizontal edge of said window.

17. A method as described in claim 13 further comprising the step of f) varying the size of said first movable graphic image depending on a relationship between the portion of information displayed within said window, along said vertical direction, to the total amount of information within said information bearing document along said vertical direction.

18. A method as described in claim 16 further comprising the step of g) varying the size of said second movable graphic image depending on a relationship between the portion of information displayed within said window, along said horizontal direction, to the total amount of information within said information bearing document along said horizontal direction.

* * * * *